United States Patent
Kashima

(10) Patent No.: US 8,489,952 B2
(45) Date of Patent: Jul. 16, 2013

(54) METHOD AND APPARATUS FOR PROVIDING ERROR DETECTION IN COORDINATION WITH A RADIO LINK LAYER

(75) Inventor: Tsuyoshi Kashima, Tokyo (JP)

(73) Assignee: Core Wireless Licensing S.a.r.l., Luxembourg (LU)

( * ) Notice: Subject to any disclaimer, the term of this patent is extended or adjusted under 35 U.S.C. 154(b) by 647 days.

(21) Appl. No.: 12/664,884

(22) PCT Filed: Jun. 13, 2008

(86) PCT No.: PCT/IB2008/001537
§ 371 (c)(1),
(2), (4) Date: Jul. 12, 2010

(87) PCT Pub. No.: WO2008/152495
PCT Pub. Date: Dec. 18, 2008

(65) Prior Publication Data
US 2010/0318869 A1 Dec. 16, 2010

Related U.S. Application Data

(60) Provisional application No. 60/944,297, filed on Jun. 15, 2007.

(51) Int. Cl.
*H04L 1/18* (2006.01)
*G08C 25/02* (2006.01)

(52) U.S. Cl.
USPC .......................... 714/748; 714/751; 714/776

(58) Field of Classification Search
None
See application file for complete search history.

(56) References Cited

U.S. PATENT DOCUMENTS

| | | | |
|---|---|---|---|
| 5,371,731 A * | 12/1994 | Pratt et al. | 370/216 |
| 6,621,796 B1 * | 9/2003 | Miklos | 370/236 |
| 2002/0090005 A1 * | 7/2002 | Jiang et al. | 370/469 |
| 2002/0191544 A1 * | 12/2002 | Cheng et al. | 370/236 |
| 2005/0147042 A1 | 7/2005 | Purnadi et al. | |
| 2005/0198028 A1 * | 9/2005 | Padmanaban et al. | 707/6 |
| 2007/0177630 A1 * | 8/2007 | Ranta et al. | 370/473 |
| 2007/0245201 A1 * | 10/2007 | Sammour et al. | 714/748 |
| 2008/0010578 A1 * | 1/2008 | Jiang | 714/748 |
| 2008/0022180 A1 * | 1/2008 | Kuo | 714/748 |
| 2008/0043619 A1 * | 2/2008 | Sammour et al. | 370/231 |
| 2008/0209297 A1 * | 8/2008 | Chandra et al. | 714/748 |
| 2008/0273551 A1 * | 11/2008 | Jiang | 370/466 |
| 2008/0301516 A1 * | 12/2008 | Han et al. | 714/748 |

FOREIGN PATENT DOCUMENTS

WO 2007/050231 A 5/2007

OTHER PUBLICATIONS

International Search Report and Written Opinion received in corresponding Patent Cooperation Treaty Application No. PCT/IB2008/001537, Nov. 6, 2008, 12 pages.

Bestak, Robert, et al., "A TCP Connection Over Uplinks UMTS Radio Access Bearer in RLC Acknowledged Mode", IEEE 55th Vehicular Technology Conference, Birmingham, AL, May 6-9, 2002, pp. 972-976.

* cited by examiner

*Primary Examiner* — Gabriel Chu

(57) ABSTRACT

An approach includes detecting failure of an error detection scheme relating to transmission of data units of a transport block. A negative acknowledgement message is generated in response to the detection of the failure. The negative acknowledgement message is forwarded to a radio link controller for discarding one or more of the data units.

14 Claims, 10 Drawing Sheets

METHOD AND APPARATUS FOR PROVIDING ERROR DETECTION IN COORDINATION WITH A RADIO LINK LAYER

RELATED APPLICATION

This application was originally filed as PCT Application No. PCT/IB2008/0501537 on Jun. 13, 2008 and claims priority to U.S. Provisional Application No. 60/944,297 filed on Jun. 15, 2007, which is incorporated herein by reference in its entirety.

RELATED APPLICATIONS

This application claims the benefit of the earlier filing date under 35 U.S.C. §119(e) of U.S. Provisional Application Ser. No. 60/944,297 filed Jun. 15, 2007, entitled "Method and Apparatus For HARQ Interaction with a Radio Link Layer," the entirety of which is incorporated herein by reference.

BACKGROUND

Radio communication systems, such as a wireless data networks (e.g., Third Generation Partnership Project (3GPP) Long Term Evolution (LTE) systems, spread spectrum systems (such as Code Division Multiple Access (CDMA) networks), Time Division Multiple Access (TDMA) networks, WiMAX (Worldwide Interoperability for Microwave Access), etc.), provide users with the convenience of mobility along with a rich set of services and features. This convenience has spawned significant adoption by an ever growing number of consumers as an accepted mode of communication for business and personal uses. To promote greater adoption, the telecommunication industry, from manufacturers to service providers, has agreed at great expense and effort to develop standards for communication protocols that underlie the various services and features. One area of effort involves control signaling to ensure efficient and accurate delivery of data.

SOME EXEMPLARY EMBODIMENTS

Therefore, there is a need for an approach for providing efficient signaling, which can co-exist with already developed standards and protocols.

According to one embodiment of the invention, a method comprises detecting failure of an error detection scheme relating to transmission of data units of a transport block. The method also comprises generating a negative acknowledgement message in response to the detection of the failure. Further, the method comprises forwarding the negative acknowledgement message to a radio link controller for discarding one or more of the data units.

According to another embodiment of the invention, an apparatus comprises logic configured to detect failure of an error detection scheme relating to transmission of data units of a transport block, and to generate a negative acknowledgement message in response to the detection of the failure. The negative acknowledgement message is forwarded to a radio link controller for discarding one or more of the data units.

According to another embodiment of the invention, an apparatus comprises means for detecting failure of an error detection scheme relating to transmission of data units of a transport block. The apparatus also comprises means for generating a negative acknowledgement message in response to the detection of the failure. The apparatus further comprises means for forwarding the negative acknowledgement message to a radio link controller for discarding one or more of the data units.

According to another embodiment of the invention, a method comprises generating, at a radio link control layer, a protocol data unit transporting one or more service data units. The method also comprises forwarding the protocol data unit to an error detection logic configured to execute an error detection scheme relating to transmission of the protocol data unit, and to determine transmission failure of the protocol data unit. Additionally, the method comprises receiving a negative acknowledgement message, at the radio link control layer, from the error detection logic. Further, the method comprises discarding one or more of the service data units in response to the negative acknowledgement message.

According to another embodiment of the invention, an apparatus comprises a radio link controller configured to generate a protocol data unit transporting one or more service data units, and to forward the protocol data unit to an error detection logic configured to execute an error detection scheme relating to transmission of the protocol data unit, and to determine transmission failure of the protocol data unit. The radio link controller is further configured to receive a negative acknowledgement message from the error detection logic, and to discard one or more of the service data units in response to the negative acknowledgement message.

According to yet another embodiment of the invention, an apparatus comprises means for generating, at a radio link control layer, a protocol data unit transporting one or more service data units. The apparatus also comprises means for forwarding the protocol data unit to an error detection logic configured to execute an error detection scheme relating to transmission of the protocol data unit, and to determine transmission failure of the protocol data unit. The apparatus further comprises means for receiving a negative acknowledgement message, at the radio link control layer, from the error detection logic; and means for discarding one or more of the service data units in response to the negative acknowledgement message.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF PREFERRED EMBODIMENTS

An apparatus, method, and software for providing hybrid automatic repeat request (HARQ) interaction with a radio link control (RLC) layer are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the embodiments of the invention are discussed with respect to a wireless network compliant with a Third Generation Partnership Project (3GPP) Long Term Evolution (LTE) architecture, it is recognized by one of ordinary skill in the art that the embodiments of the inventions have applicability to any type of communication system and equivalent functional capabilities.

Figure 1:
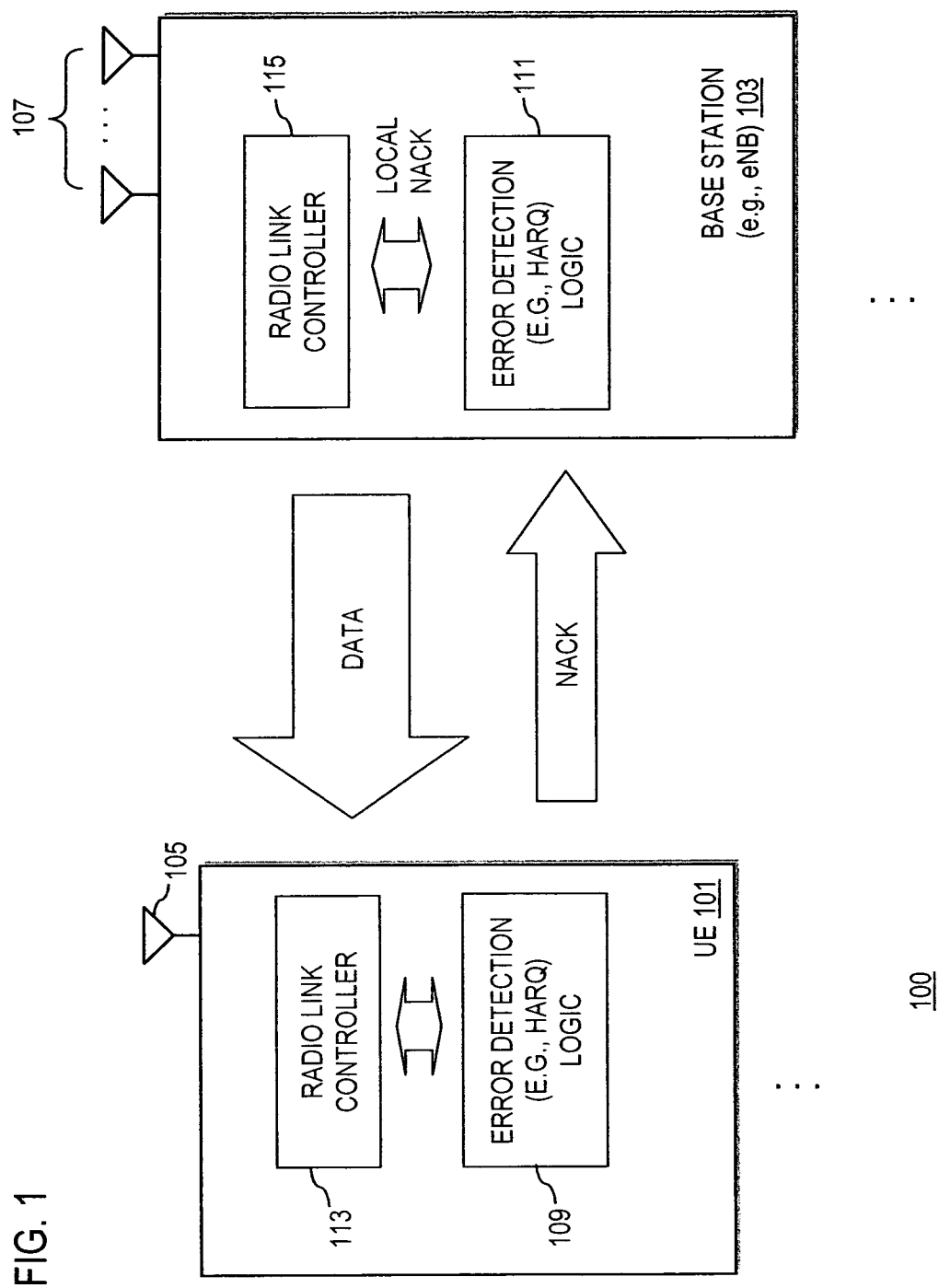
FIG. 1 is a diagram of a communication system capable of providing local negative acknowledgement, according to an exemplary embodiment.

FIG. 1 is a diagram of a communication system capable of providing local negative acknowledgement, according to an exemplary embodiment. As shown in FIG. 1, one or more user equipment (UEs) 101 communicate with a base station 103, which is part of an access network (e.g., 3GPP LTE (or E-UTRAN, etc.). Under the 3GPP LTE architecture (as shown in FIGS. 6A-6D), the base station 103 is denoted as an enhanced Node B (eNB). The UE 101 can be any type of mobile stations, such as handsets, terminals, stations, units, devices, multimedia tablets, Internet nodes, communicators, Personal Digital Assistants or any type of interface to the user (such as "wearable" circuitry, etc.). The UE 101 includes a transceiver (not shown) and an antenna system 105 that couples to the transceiver to receive or transmit signals from the base station 103. The antenna system 105 can include one or more antennas.

As with the UE 101, the base station 103 employs a transceiver (not shown), which transmits information to the UE 101. Also, the base station 103 can employ one or more antennas 107 for transmitting and receiving electromagnetic signals. For instance, the Node B 103 may utilize a Multiple Input Multiple Output (MIMO) antenna system 107, whereby the Node B 103 can support multiple antenna transmit and receive capabilities. This arrangement can support the parallel transmission of independent data streams to achieve high data rates between the UE 101 and Node B 103. The base station 103, in an exemplary embodiment, uses OFDM (Orthogonal Frequency Divisional Multiplexing) as a downlink (DL) transmission scheme and a single-carrier transmission (e.g., SC-FDMA (Single Carrier-Frequency Division Multiple Access) with cyclic prefix for the uplink (UL) transmission scheme. SC-FDMA can also be realized using a DFT-S-OFDM principle, which is detailed in 3GGP TR 25.814, entitled "Physical Layer Aspects for Evolved UTRA," v.1.5.0, May 2006 (which is incorporated herein by reference in its entirety). SC-FDMA, also referred to as Multi-User-SC-FDMA, allows multiple users to transmit simultaneously on different sub-bands.

To ensure reliable data transmission, the system 100 of FIG. 1, in certain embodiments, uses concatenation of Forward Error Correction (FEC) coding and an Automatic Repeat Request (ARQ) protocol commonly known as Hybrid ARQ (HARQ). Automatic Repeat Request (ARQ) is an error detection mechanism using error detection logic 109, 111. This mechanism permits the receiver (either UE 101 or base station 103) to indicate to the transmitter (either UE 101 or base station 103) that a packet or sub-packet has been received incorrectly, and thus, the receiver can request the transmitter to resend the particular packet(s). This can be accomplished with a Stop and Wait (SAW) procedure, in which the transmitter waits for a response from the receiver before sending or resending packets. The erroneous packets are used in conjunction with retransmitted packets.

According to certain embodiments, the system 100 provides synchronous HARQ and asynchronous HARQ. Synchronous HARQ means that the network is restricted in allocation of resources for re-transmission. This suggests that the network needs to re-use current allocation either with (scheduled synchronous) or without (unscheduled synchronous) any changes, at specific time/frequency after the first transmission (new data transmission). By contrast, with asynchronous HARQ, no timing requirements with respect to scheduling of resources to the UE 101 are needed for the HARQ re-transmission.

From the perspective of the UE 101, synchronous HARQ is simple and allows for power saving. However, this scheme does restrict the scheduling freedom of packets in the network, potentially affecting the amount of needed re-transmissions so as to increase UE power consumption (e.g., in the case of unfavorable scheduling options). From the scheduler point of view, the benefit of synchronous re-transmission is that there is no need to use any channel resources for scheduling of re-transmissions.

According to certain embodiments, the system 100 provides for generating a local negative acknowledgement (NACK) message to a Radio Link Controller (RLC) 113, 115 upon detection of a Hybrid Automatic Repeat Request (HARQ) failure in a sending entity. For example, assuming the NACK is received by the base station 103, the RLC 115 then discards data associated with the data transmission that triggered the HARQ failure if the RLC cannot recover the lost data transmission due to the HARQ failure. Such recovery is not possible, for example, in the case of unacknowledged mode operation, or in the situation involving the last retransmission in the acknowledged mode operation.

The RLC 115 provides RLC layer functions. For instance, the RLC 115 provides segmentation and concatenation on the data received from an upper layer. The RLC layer ensures quality of service (QoS) guarantees, and defines the following types of RLC modes of operation: a transparent mode (TM), an unacknowledged mode (UM), and an acknowledged mode (AM). These three RLC modes support different QoS levels. The RLC layer is more fully described below and in 3GPP TS36.300, which is incorporated herein by reference in its entirety.

The system 100 provides various channel types: physical channels, transport channels, and logical channels. In this example, the physical channels are established between the UE 101 and the base station 103, and transport channels and logical channels are established among the UE 101, BS 103 and a Radio Network Controller (RNC) (not shown). Physical channels can include a physical downlink shared channel (PDSCH), a dedicated physical downlink dedicated channel (DPDCH), a dedicated physical control channel (DPCCH), etc.

The transport channels can be defined by how they transfer data over the radio interface and the characteristics of the data. The transport channels include a broadcast channel (BCH), paging channel (PCH), a dedicated shared channel (DSCH), etc. Other exemplary transport channels are an uplink (UL) Random Access Channel (RACH), Common Packet Channel (CPCH), Forward Access Channel (FACH), Downlink Shared Channel (DSCH), Uplink Shared Channel (USCH), Broadcast Channel (BCH), and Paging Channel (PCH). A dedicated transport channel is the UL/DL Dedicated Channel (DCH). Each transport channel is mapped to one or more physical channels according to its physical characteristics.

Moreover, each logical channel can be defined by the type and required Quality of Service (QoS) of information that it carries. The associated logical channels include, for example, a broadcast control channel (BCCH), a paging control channel (PCCH), Dedicated Control Channel (DCCH), Common Control Channel (CCCH), Shared Channel Control Channel (SHCCH), Dedicated Traffic Channel (DTCH), Common Traffic Channel (CTCH), etc.

According to one embodiment, layer 2 utilized by the system 100 of FIG. 1 includes the following sublayers: Medium Access Control (MAC), Radio Link Control (RLC) and Packet Data Convergence Protocol (PDCP). Service Access Points (SAP) for peer-to-peer communication are marked with circles at the interface between sublayers. The SAP between the physical layer and the MAC sublayer provides the transport channels. The SAPs between the MAC sublayer and the RLC sublayer provide the logical channels. The multiplexing of several logical channels (i.e., radio bearers) on the same transport channel (i.e. transport block) is performed by the MAC sublayer.

Figure 2:
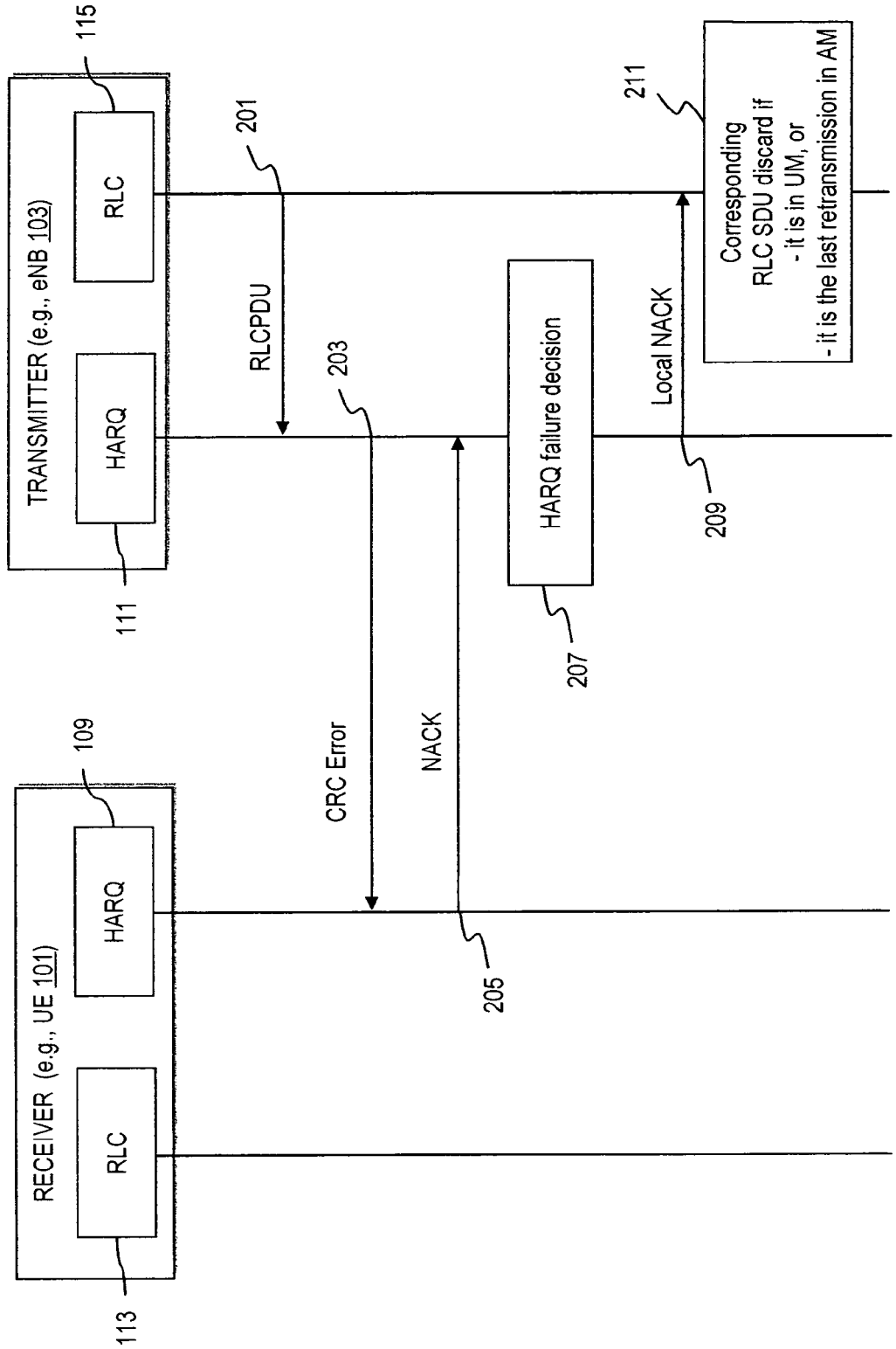
FIG. 2 is a diagram of a communication system capable of providing hybrid automatic repeat request (HARQ) interaction with a radio link control (RLC) layer, according to an exemplary embodiment.

FIG. 2 is a diagram of a communication system capable of providing hybrid automatic repeat request (HARQ) interaction with a radio link control (RLC) layer, according to an exemplary embodiment. As seen, a receiver and a transmitter include a radio link control (RLC) layer (or entity) and a HARQ process. In the system 100 of FIG. 1, the UE 101 and the eNB 103 can assume either role of receiver or transmitter depending on the particular direction of communication. By way of example, the process is explained wherein the UE 101 behaves as a receiver, while the eNB 103 is the transmitter. In the TM RLC mode, no overhead is attached to the RLC SDU (Service Data Unit) received from an upper layer protocol when constituting a RLC PDU (Protocol Data Unit). The RLC can pass the SDU in a transparent manner.

Figure 4:
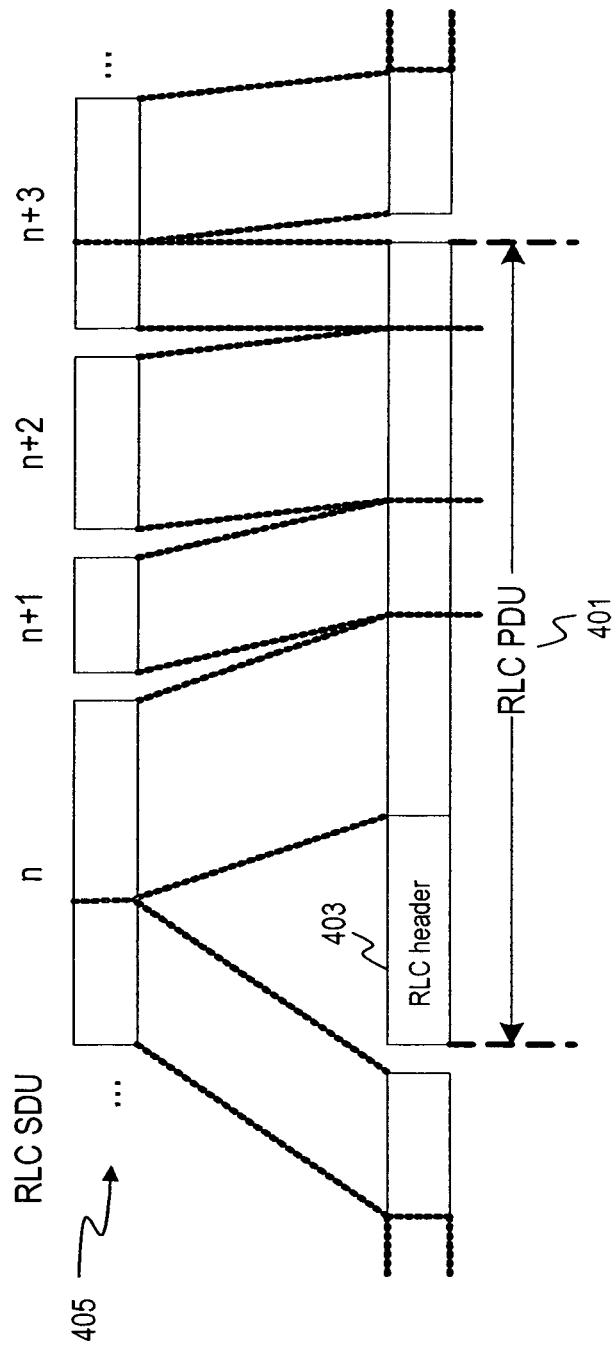
FIG. 4 is a diagram of an exemplary format for a protocol data unit (PDU) generation by using segmentation and concatenation, according to an exemplary embodiment of the invention.

The UM RLC and AM RLC modes both entail some overhead that is added at the RLC. The format of RLC PDU is shown in FIG. 4. Segmentation is performed according to the size of the transport block (TB). If an RLC SDU does not fit entirely into the transport block (TB), then the RLC SDU is segmented into variable sized RLC PDUs (which do not include any padding). Data transmission involves adding to each PDU a PDU header that specifies a sequence number (SN), such that the receiving end 101 can know its order and which PDU had been lost during transmission (i.e., the PDU is missing).

With UM RLC, the transmitter 103 does not check whether the receiving end properly received the corresponding PDU, and the missing PDUs cannot be recovered. From the receiver side, the particular missing PDUs are determined by referring to the sequence numbers of the received PDUs. The receiver 101 does not wait for retransmission of the missing PDUs. Given this characteristic, the UM RLC, in the user plane, can support real-time transmissions (e.g., Voice over IP (VoIP), audio and video streaming, etc.).

With AM RLC, unlike UM RLC, the receiver 101 provides acknowledgement for received PDUs. Thus, missing PDUs are re-transmitted. The AM RLC mode of operation is well-suited for non-real-time packet data transmissions.

In this LTE system of FIG. 1, Hybrid ARQ (HARQ) interaction with RLC is specified. As mentioned, this mechanism permits the receiver 101 to indicate to the transmitter 103 that a packet or sub-packet has been received incorrectly, and thus, requests the transmitter 103 to resend the particular packet(s). HARQ is performed on each transport block (TB), which is a concatenated block of RLC PDUs belonging to different logical channels. Cyclic Redundancy Check (CRC) is performed by the physical layer on the receiver side to detect an error of the transport block (TB).

Generally, acknowledgement/negative acknowledgement (ACK/NACK) signaling in the HARQ scheme follows with each transmitted packet either by using explicit signalling or implicit signaling. Namely, ACK is used to indicate the correctly received packet. However, a NACK message indicates the packet is not received correctly.

Although HARQ/ARQ is specified in LTE for the error recovery, it is recognized that the information from HARQ is also useful for the SDU discard to achieve better radio utilization. In the unacknowledged mode (UM) operation of radio link controller (RLC), and in the acknowledged mode (AM) operation of RLC when the maximum number of ARQ retransmission is reached, the lost segments due to the HARQ failure cannot be recovered as no ARQ retransmission is performed for them. Furthermore, if a segment of an IP packet is lost, the IP packet cannot be used at all, and is to be discarded on receiver side. Therefore, transmitting the other segments of the same RLC SDU is a waste of radio resource.

In this exemplary scenario, the transmitter Radio Link Control (RLC) entity (e.g., RLC 115) signals a sequence number (SN) in the PDU header, which is used by the receiver 101 to ensure that no PDUs are lost in the transmission. If there are PDUs lost during the transmission, as realized by the out-of-sequence delivery of PDUs, the receiving RLC entity sends a status report PDU to inform the sending RLC entity that certain PDUs are missing. The status report PDU describes the status of the successful and/or unsuccessful data transmissions, identifying the SNs of the PDUs that are lost or received. If a PDU is lost, the sending RLC entity retransmits a duplicate of the lost PDU to the receiving RLC. Although the HARQ operation removes some failed transmissions and increases the probability of successful delivery of data, it is the RLC protocol layer that ultimately ensures successful delivery.

In FIG. 2, the RLC entity 115 sends, as in step 201, a RLC PDU to the HARQ entity 111, which in turn, communicates with the HARQ entity 109 of the receiver 101. According to one embodiment, the MAC sublayer (not shown) multiplexes RLC PDUs from different logical channels into a single transport block; the HARQ is performed on the transport block. In this scenario, the HARQ entity 111 indicates a CRC error, per step 203. As such, the HARQ entity 109 signals a NACK to the HARQ entity 111 of the transmitter 103 (step 205). At this point the HARQ entity 111 declares a HARQ failure, resulting in transmission of a local NACK to the local RLC 115, as in steps 207 and 209. As noted, the HARQ mechanism is applied to the single transport block. Hence, in such a case, the local NACK pertains to this transport block, and not for each individual RLC PDU.

The local RLC 115 can then discard, per step 211, any RLC SDUs that have yet to be transmitted. This discard process is applicable in the UM or, if the data units are associated with the last retransmission, in the AM. Further details of this process are explained with respect to FIG. 3.

Figure 3:
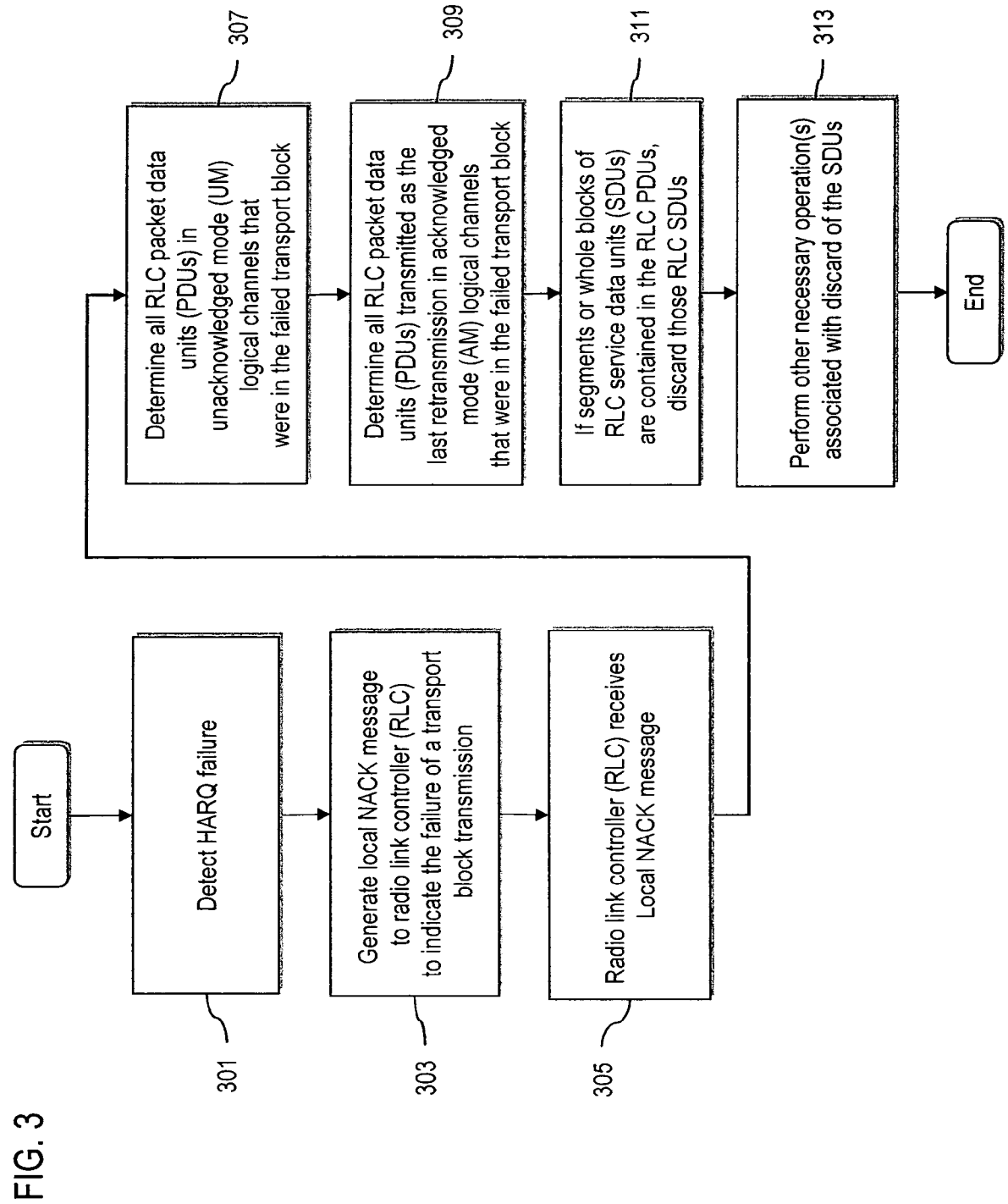
FIG. 3 is a flowchart of a process for providing local acknowledgement signaling and discard of associated data units, according to an exemplary embodiment.

FIG. 3 is a flowchart of a process for providing local acknowledgement signaling and discard of associated data units, according to an exemplary embodiment. Continuing with the example of FIG. 2, if HARQ entity 111 of the transmitter 103 (also referred to as "HARQ transmitter") decides that a HARQ failure has occurred (step 301), the HARQ transmitter 111 generates and effectively provides a local NACK message, as in step 303, to the RLC 115 of the transmitter 103. It is noted that this local NACK need not be directed only to HARQ entity 111, but also to RLC 115 in general. If RLC 115 receives a local NACK (step 305), the RLC 115 checks all UM logical channels that are transmitting RLC PDUs into the corresponding transport block, and all AM logical channels that are transmitting the last retransmission of RLC PDUs into the corresponding transport block. That is, the RLC 115 notes all the PDUs associated with the failed transport block, per steps 307 and 309.

Subsequently, the RLC discards all the RLC SDUs to which the transmitted RLC PDUs belong, per step 311. In addition, in step 313, other necessary operation related to the SDU discard such as the reporting to the upper layer, if any, is also performed as usual.

According to various embodiments, the communication system of FIG. 1 utilizes an architecture compliant with the UMTS terrestrial radio access network (UTRAN) or Evolved UTRAN (E-UTRAN) in 3GPP.

FIG. 4 is diagram of a protocol data unit (PDU) for a PDU format for supporting acknowledged mode (AM) and unacknowledged mode (UM), according to an exemplary embodiment of the invention. As seen, a RLC PDU structure 401 includes an RLC header 403, which specifies the PDU sequence number. A RLC SDU structure 405, in this example, are segmented, n, n+1, n+2, n+3, .... Because concatenation is performed in sequence, the content of the RLC PDU 401 can generally be described by the following relations: {0; 1} last segment of $SDU_i$+[0; n] complete SDUs+{0; 1} first segment of $SDU_{i+n+1}$; or 1 segment of $SDU_i$.

The described processes, according to certain embodiments, provide efficient use of radio resources by avoiding unnecessary transmissions.

One of ordinary skill in the art would recognize that the processes for providing error correction may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below with respect to FIG. 5.

Figure 5:
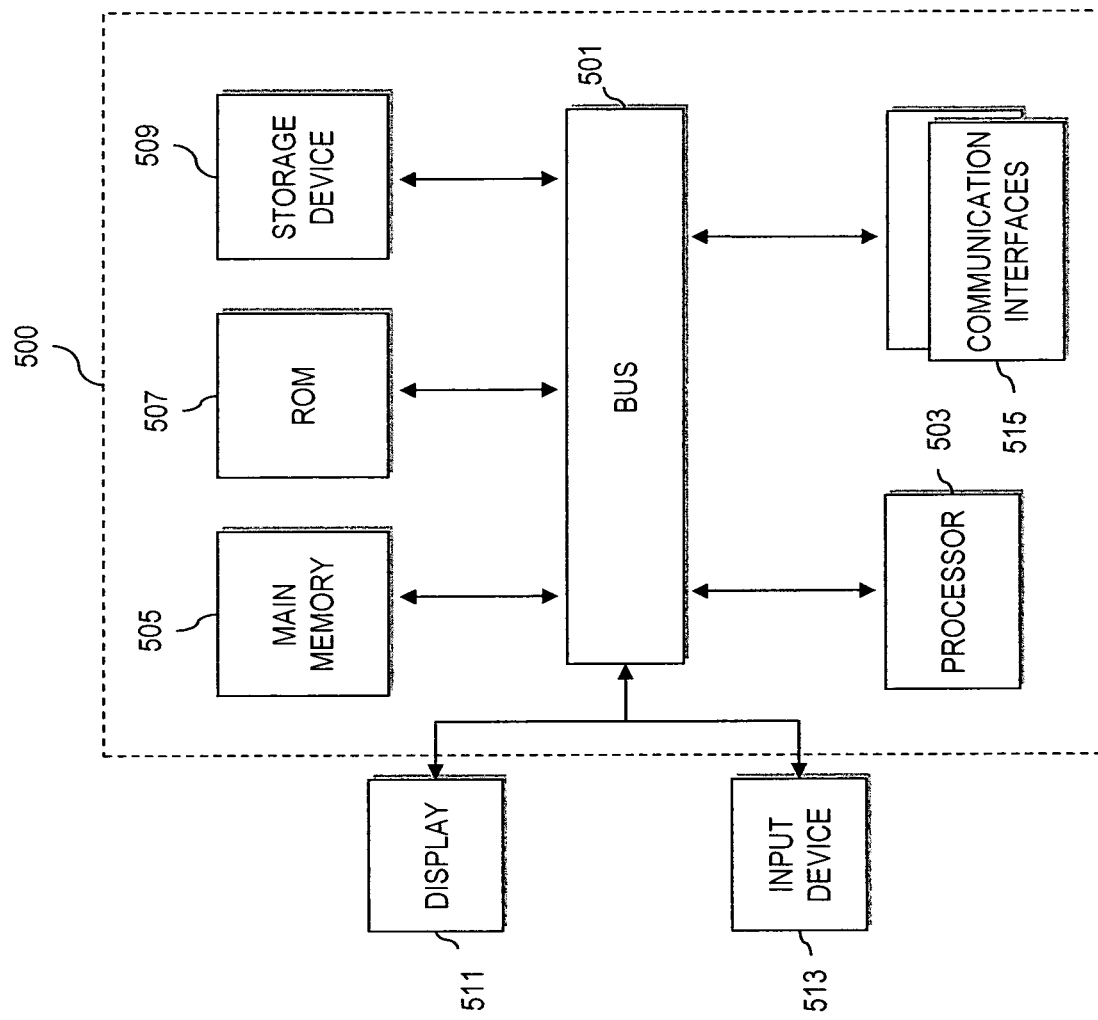
FIG. 5 is a diagram of hardware that can be used to implement an embodiment of the invention.

FIG. 5 illustrates exemplary hardware upon which various embodiments of the invention can be implemented. A computing system 500 includes a bus 501 or other communication mechanism for communicating information and a processor 503 coupled to the bus 501 for processing information. The computing system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computing system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computing system 500 may be coupled with the bus 501 to a display 511, such as a liquid crystal display, or active matrix display, for displaying information to a user. An input device 513, such as a keyboard including alphanumeric and other keys, may be coupled to the bus 501 for communicating information and command selections to the processor 503. The input device 513 can include a cursor control, such as a mouse, a trackball, or cursor direction keys, for communicating direction information and command selections to the processor 503 and for controlling cursor movement on the display 511.

According to various embodiments of the invention, the processes described herein can be provided by the computing system 500 in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 500 also includes at least one communication interface 515 coupled to bus 501. The communication interface 515 provides a two-way data communication coupling to a network link (not shown). The communication interface 515 sends and receives electrical, electromagnetic, or optical signals that carry digital data streams representing various types of information. Further, the communication interface 515 can include peripheral interface devices, such as a Universal Serial Bus (USB) interface, a PCMCIA (Personal Computer Memory Card International Association) interface, etc.

The processor 503 may execute the transmitted code while being received and/or store the code in the storage device 509, or other non-volatile storage for later execution. In this manner, the computing system 500 may obtain application code in the form of a carrier wave.

The term "computer-readable medium" as used herein refers to any medium that participates in providing instructions to the processor 503 for execution. Such a medium may take many forms, including but not limited to non-volatile media, volatile media, and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIGS. 6A-6D are diagrams of communication systems having exemplary long-term evolution (LTE) architectures, in which the user equipment (UE) and the base station of FIG. 1 can operate, according to various exemplary embodiments of the invention. By way of example (shown in FIG. 6A), a base station (e.g., destination node 103) and a user equipment (UE) (e.g., source node 101) can communicate in system 600 using any access scheme, such as Time Division Multiple Access (TDMA), Code Division Multiple Access (CDMA), Wideband Code Division Multiple Access (WCDMA), Orthogonal Frequency Division Multiple Access (OFDMA) or Single Carrier Frequency Division Multiple Access (FDMA) (SC-FDMA) or a combination of thereof. In an exemplary embodiment, both uplink and downlink can utilize WCDMA. In another exemplary embodiment, uplink utilizes SC-FDMA, while downlink utilizes OFDMA.

Figure 6A:
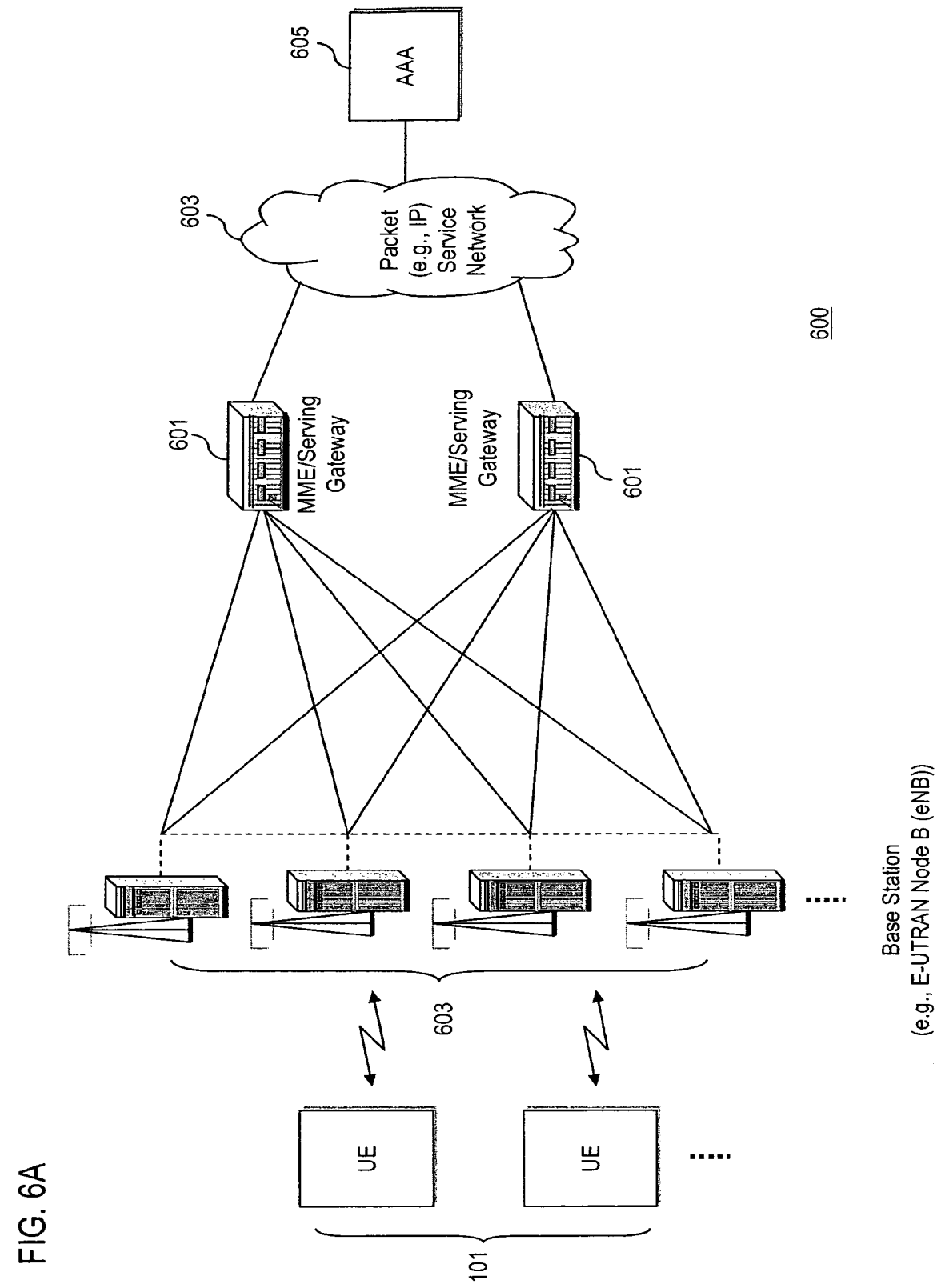
FIGS. 6A-6D are diagrams of communication systems having exemplary long-term evolution (LTE) and E-UTRA (Evolved Universal Terrestrial Radio Access) architectures, in which the system of FIG. 1 can operate to provide control signaling, according to various exemplary embodiments of the invention.

The communication system 600 is compliant with 3GPP LTE, entitled "Long Term Evolution of the 3GPP Radio Technology" (which is incorporated herein by reference in its entirety). As shown in FIG. 6A, one or more user equipment (UEs) 101 communicate with a network equipment, such as a base station 103, which is part of an access network (e.g., WiMAX (Worldwide Interoperability for Microwave Access), 3GPP LTE (or E-UTRAN), etc.). Under the 3GPP LTE architecture, base station 103 is denoted as an enhanced Node B (eNB).

MME (Mobile Management Entity)/Serving Gateways 601 are connected to the eNBs 103 in a full or partial mesh configuration using tunneling over a packet transport network (e.g., Internet Protocol (IP) network) 603. Exemplary functions of the MME/Serving GW 601 include distribution of paging messages to the eNBs 103, termination of U-plane packets for paging reasons, and switching of U-plane for support of UE mobility. Since the GWs 601 serve as a gateway to external networks, e.g., the Internet or private networks 603, the GWs 601 include an Access, Authorization and Accounting system (AAA) 605 to securely determine the identity and privileges of a user and to track each user's activities. Namely, the MME Serving Gateway 601 is the key control-node for the LTE access-network and is responsible for idle mode UE tracking and paging procedure including retransmissions. Also, the MME 601 is involved in the bearer activation/deactivation process and is responsible for selecting the SGW (Serving Gateway) for a UE at the initial attach and at time of intra-LTE handover involving Core Network (CN) node relocation.

A more detailed description of the LTE interface is provided in 3GPP TR 25.813, entitled "E-UTRA and E-UTRAN: Radio Interface Protocol Aspects," which is incorporated herein by reference in its entirety.

Figure 6B:
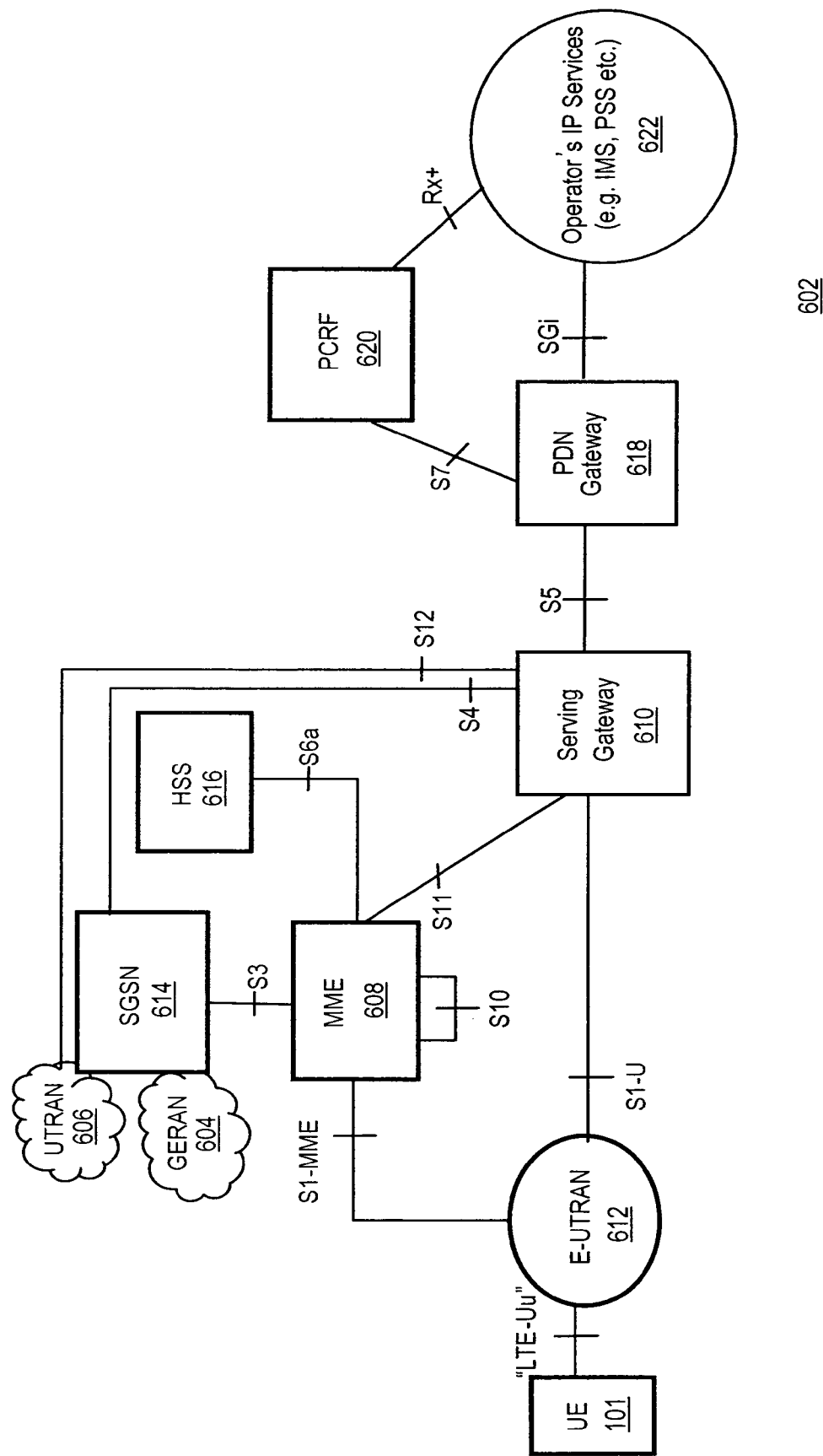

In FIG. 6B, a communication system 602 supports GERAN (GSM/EDGE radio access) 604, and UTRAN 606 based access networks, E-UTRAN 612 and non-3GPP (not shown) based access networks, and is more fully described in TR 23.882, which is incorporated herein by reference in its entirety. A key feature of this system is the separation of the network entity that performs control-plane functionality (MME 608) from the network entity that performs bearer-plane functionality (Serving Gateway 610) with a well defined open interface between them S11. Since E-UTRAN 612 provides higher bandwidths to enable new services as well as to improve existing ones, separation of MME 608 from Serving Gateway 610 implies that Serving Gateway 610 can be based on a platform optimized for signaling transactions. This scheme enables selection of more cost-effective platforms for, as well as independent scaling of, each of these two elements. Service providers can also select optimized topological locations of Serving Gateways 610 within the network independent of the locations of MMEs 608 in order to reduce optimized bandwidth latencies and avoid concentrated points of failure.

As seen in FIG. 613, the E-UTRAN (e.g., eNB) 612 interfaces with UE 101 via LTE-Uu. The E-UTRAN 612 supports LTE air interface and includes functions for radio resource control (RRC) functionality corresponding to the control plane MME 608. The E-UTRAN 612 also performs a variety of functions including radio resource management, admission control, scheduling, enforcement of negotiated uplink (UL) QoS (Quality of Service), cell information broadcast, ciphering/deciphering of user, compression/decompression of downlink and uplink user plane packet headers and Packet Data Convergence Protocol (PDCP).

The MME 608, as a key control node, is responsible for managing mobility UE identifies and security parameters and paging procedure including retransmissions. The MME 608 is involved in the bearer activation/deactivation process and is also responsible for choosing Serving Gateway 610 for the UE 101. MME 608 functions include Non Access Stratum (NAS) signaling and related security. MME 608 checks the authorization of the UE 101 to camp on the service provider's Public Land Mobile Network (PLMN) and enforces UE 101 roaming restrictions. The MME 608 also provides the control plane function for mobility between LTE and 2G/3G access networks with the S3 interface terminating at the MME 608 from the SGSN (Serving GPRS Support Node) 614.

The SGSN 614 is responsible for the delivery of data packets from and to the mobile stations within its geographical service area. Its tasks include packet routing and transfer, mobility management, logical link management, and authentication and charging functions. The S6a interface enables transfer of subscription and authentication data for authenticating/authorizing user access to the evolved system (AAA interface) between MME 608 and HSS (Home Subscriber Server) 616. The S10 interface between MMEs 608 provides MME relocation and MME 608 to MME 608 information transfer. The Serving Gateway 610 is the node that terminates the interface towards the E-UTRAN 612 via S1-U.

The S1-U interface provides a per bearer user plane tunneling between the E-UTRAN 612 and Serving Gateway 610. It contains support for path switching during handover between eNBs 103. The S4 interface provides the user plane with related control and mobility support between SGSN 614 and the 3GPP Anchor function of Serving Gateway 610.

The S12 is an interface between UTRAN 606 and Serving Gateway 610. Packet Data Network (PDN) Gateway 618 provides connectivity to the UE 101 to external packet data networks by being the point of exit and entry of traffic for the UE 101. The PDN Gateway 618 performs policy enforcement, packet filtering for each user, charging support, lawful interception and packet screening. Another role of the PDN Gateway 618 is to act as the anchor for mobility between 3GPP and non-3GPP technologies such as WiMax and 3GPP2 (CDMA 1x and EvDO (Evolution Data Only)).

The S7 interface provides transfer of QoS policy and charging rules from PCRF (Policy and Charging Role Function) 620 to Policy and Charging Enforcement Function (PCEF) in the PDN Gateway 618. The SGi interface is the interface between the PDN Gateway and the operator's IP services including packet data network 622. Packet data network 622 may be an operator external public or private packet data network or an intra operator packet data network, e.g., for provision of IMS (IP Multimedia Subsystem) services. Rx+ is the interface between the PCRF and the packet data network 622.

Figure 6C:
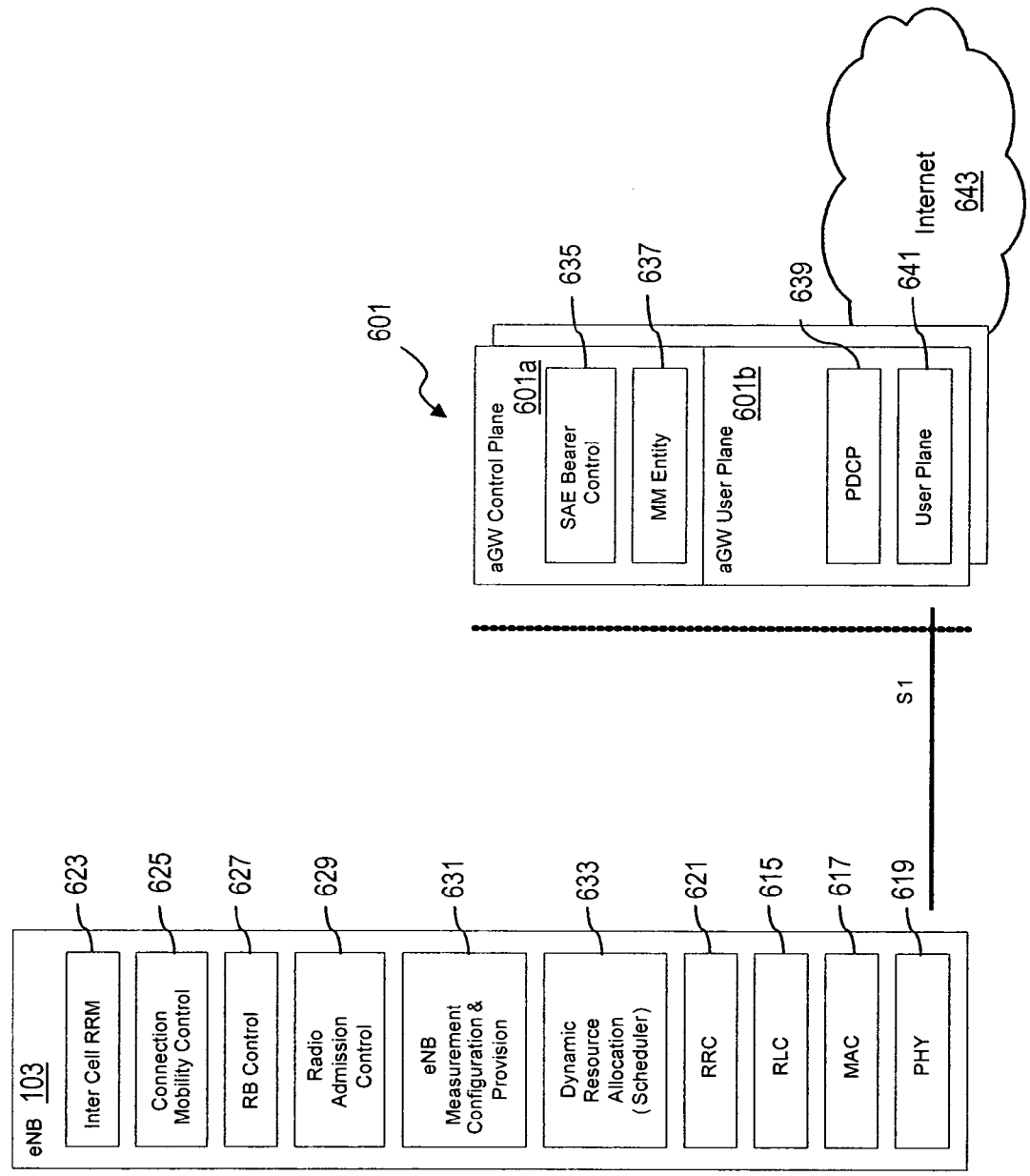

As seen in FIG. 6C, the eNB 103 utilizes an E-UTRA (Evolved Universal Terrestrial Radio Access) (user plane, e.g., RLC (Radio Link Control) 615, MAC (Media Access Control) 617, and PHY (Physical) 619, as well as a control plane (e.g., RRC 621)). The eNB 103 also includes the following functions: Inter Cell RRM (Radio Resource Management) 623, Connection Mobility Control 625, RB (Radio Bearer) Control 627, Radio Admission Control 629, eNB Measurement Configuration and Provision 631, and Dynamic Resource Allocation (Scheduler) 633.

The eNB 103 communicates with the aGW 601 (Access Gateway) via an S1 interface. The aGW 601 includes a User Plane 601*a* and a Control plane 601*b*. The control plane 601*b* provides the following components: SAE (System Architecture Evolution) Bearer Control 635 and MM (Mobile Management) Entity 637. The user plane 601*b* includes a PDCP (Packet Data Convergence Protocol) 639 and a user plane functions 641. It is noted that the functionality of the aGW 601 can also be provided by a combination of a serving gateway (SGW) and a packet data network (PDN) GW. The aGW 601 can also interface with a packet network, such as the Internet 643.

Figure 6D:
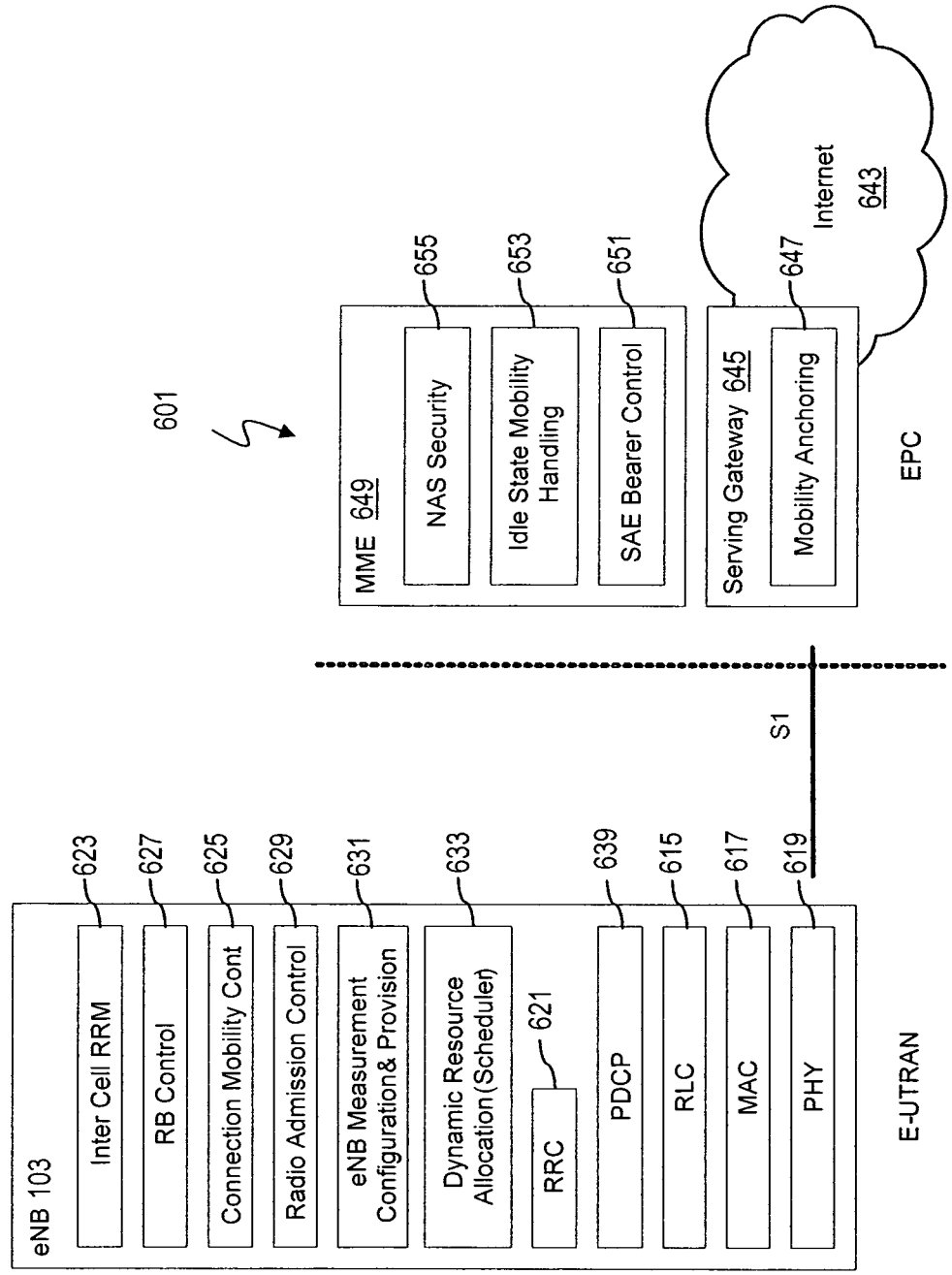

In an alternative embodiment, as shown in FIG. 6D, the PDCP (Packet Data Convergence Protocol) functionality can reside in the eNB 103 rather than the GW 601. Other than this PDCP capability, the eNB functions of FIG. 6C are also provided in this architecture.

In the system of FIG. 6D, a functional split between E-UTRAN and EPC (Evolved Packet Core) is provided. In this example, radio protocol architecture of E-UTRAN is provided for the user plane and the control plane. A more detailed description of the architecture is provided in 3GPP TS 86.300.

The eNB 103 interfaces via the S1 to the Serving Gateway 645, which includes a Mobility Anchoring function 647. According to this architecture, the MME (Mobility Management Entity) 649 provides SAE (System Architecture Evolution) Bearer Control 651, Idle State Mobility Handling 653, and NAS (Non-Access Stratum) Security 655.

Figure 7:
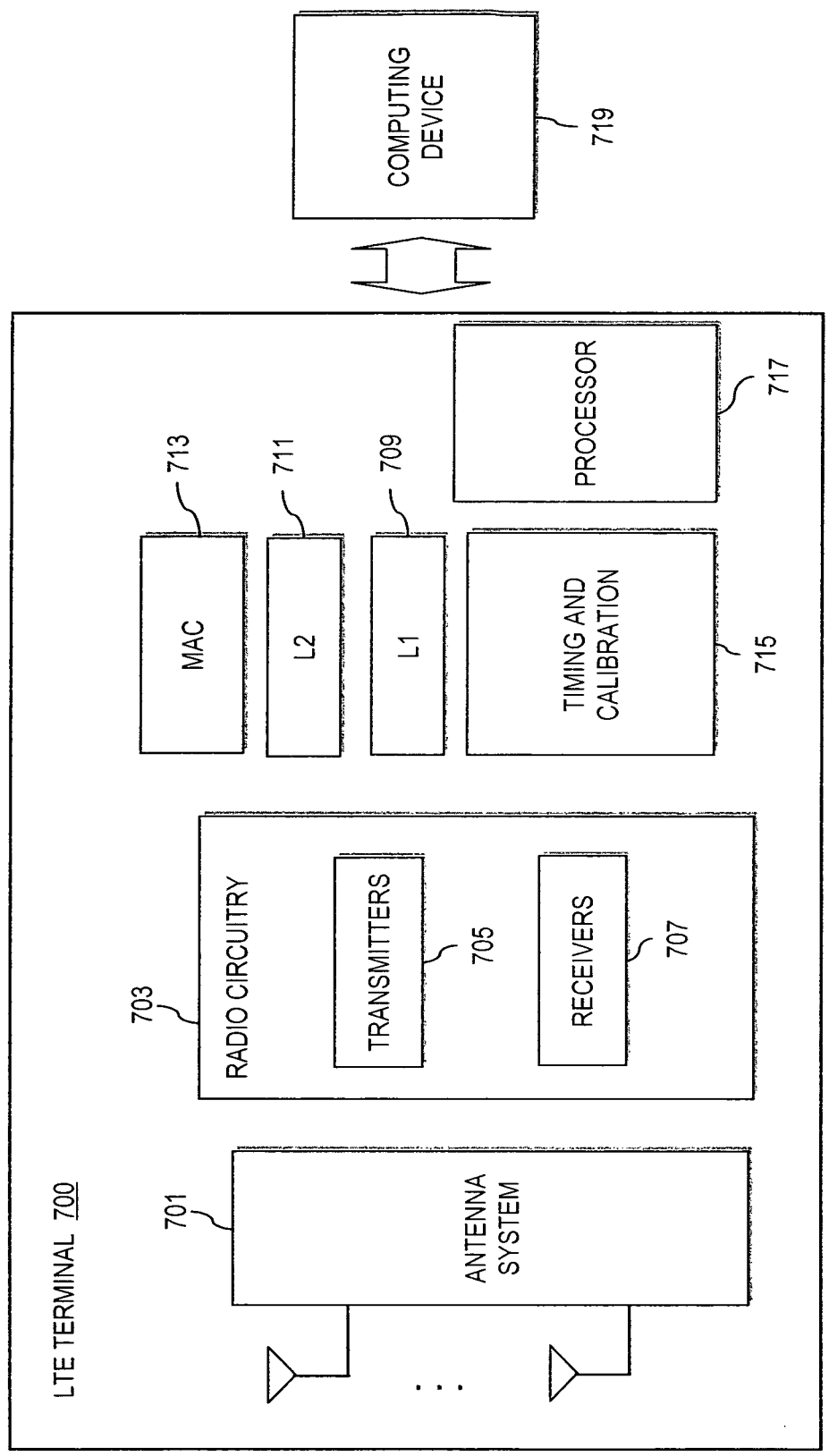
FIG. 7 is a diagram of exemplary components of an LTE terminal capable of operating in the systems of FIGS. 6A-6D, according to an embodiment of the invention.

FIG. 7 is a diagram of exemplary components of an LTE terminal capable of operating in the systems of FIGS. 6A-6D, according to an embodiment of the invention. An LTE terminal 700 is configured to operate in a Multiple Input Multiple Output (MIMO) system. Consequently, an antenna system 701 provides for multiple antennas to receive and transmit signals. The antenna system 701 is coupled to radio circuitry 703, which includes multiple transmitters 705 and receivers 707. The radio circuitry encompasses all of the Radio Frequency (RF) circuitry as well as base-band processing circuitry. As shown, layer-1 (L1) and layer-2 (L2) processing are provided by units 709 and 711, respectively. Optionally, layer-3 functions can be provided (not shown). Module 713 executes all MAC layer functions. A timing and calibration module 715 maintains proper timing by interfacing, for example, an external timing reference (not shown). Additionally, a processor 717 is included. Under this scenario, the LTE terminal 700 communicates with a computing device 719, which can be a personal computer, work station, a PDA, web appliance, cellular phone, etc.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   detecting failure of an error detection scheme relating to transmission of data units of a transport block;
   generating a negative acknowledgement message in response to the detection of the failure;
   forwarding the negative acknowledgement message to a radio link controller for discarding one or more of the data units, and
   upon receipt of the negative acknowledgement message, examining one or more unacknowledged logical channels to determine whether the unacknowledged logical channels are transporting one of the data units.

2. A method according to claim 1, wherein the radio link controller is configured, upon receipt of the negative acknowledgement message, to examine one or more acknowledged logical channels to determine whether the acknowledged logical channels are transporting a last retransmission of one of the data units.

3. A method according to claim 1, wherein the error detection scheme includes a Hybrid Automatic Repeat Request (HARQ) mechanism.

4. A method according to claim 1, wherein the negative acknowledgement message is generated according to a layer 2 protocol that includes a medium access control (MAC) sublayer for multiplexing logical channels to form the transport block.

5. A method according to claim 1, wherein the negative acknowledgement message is not directed to the error detection scheme.

6. A non-transitory computer-readable storage medium carrying one or more sequences of one or more instructions which, when executed by one or more processors, cause the one or more processors to perform
- detecting failure of an error detection scheme relating to transmission of data units of a transport block;
- generating a negative acknowledgement message in response to the detection of the failure;
- forwarding the negative acknowledgement message to a radio link controller for discarding one or more of the data units, and
- upon receipt of the negative acknowledgement message, examining one or more unacknowledged logical channels to determine whether the unacknowledged logical channels are transporting one of the data units.

7. An apparatus comprising:
- at least one processor; and
- at least one memory including computer program code
- the at least one memory and the computer program code configured to, with the at least one processor, cause the apparatus to perform at least the following
- detecting failure of an error detection scheme relating to transmission of data units of a transport block, and generating a negative acknowledgement message in response to the detection of the failure,
- wherein the negative acknowledgement message is forwarded to a radio link controller for discarding one or more of the data units, wherein the radio link controller is configured, upon receipt of the negative acknowledgement message, to examine one or more unacknowledged logical channels to determine whether the unacknowledged logical channels are transporting a data unit corresponding to the transport block.

8. An apparatus according to any one of claim 7, wherein the radio link controller is configured, upon receipt of the negative acknowledgement message, to examine one or more acknowledged logical channels to determine whether the acknowledged logical channels are transporting a last retransmission of one of the data units.

9. An apparatus according to claim 8, wherein the error detection scheme includes a Hybrid Automatic Repeat Request (HARQ) mechanism.

10. An apparatus according to claim 9, wherein the negative acknowledgement message is generated according to a layer 2 protocol that includes a medium access control (MAC) sublayer for multiplexing logical channels to form the transport block.

11. An apparatus according to claim 10, wherein the negative acknowledgement message is not directed to the error detection scheme.

12. A method comprising:
- generating, at a radio link control layer, a protocol data unit transporting one or more service data units;
- forwarding the protocol data unit to an error detection logic configured to execute an error detection scheme relating to transmission of the protocol data unit, and to determine transmission failure of the protocol data unit;
- receiving, at the radio link control layer, a negative acknowledgement message from the error detection logic;
- discarding one or more of the service data units in response to the negative acknowledgement message; and
- examining one or more unacknowledged logical channels to determine whether the unacknowledged logical channels are transporting the service data units.

13. A method according to claim 12, further comprising:
- examining one or more acknowledged logical channels to determine whether the acknowledged logical channels are transporting a last retransmission of one of the data units.

14. A method according to claim 13, wherein the error detection scheme includes a Hybrid Automatic Repeat Request (HARQ) mechanism.

* * * * *